March 3, 1953   F. TERDINA   2,630,022
DUAL SCREW DRIVE
Filed Oct. 26, 1951

INVENTOR.
FRANK TERDINA
BY Glenn Orlob
AGENT

Patented Mar. 3, 1953

2,630,022

UNITED STATES PATENT OFFICE 2,630,022

DUAL SCREW DRIVE

Frank Terdina, Seattle, Wash., assignor to Boeing Airplane Company, Seattle, Wash., a corporation of Delaware Application October 26, 1951, Serial No. 253,414

2 Claims. (Cl. 74—424.8)

This invention relates to a dual screw drive with both the screw and nut independently driven.

The invention comprises a screw rotatably mounted, a power unit to rotate the screw through a worm gear drive, a nut and a non-rotatable housing separated by a thrust bearing and mounted for travel along the screw, another power unit to rotate the nut through a worm gear drive, the power unit moving axially with the housing, and mounting projections on the housing to receive connecting rods extending to movable elements.

The purpose of the invention is to provide a compact dual drive screw having both a high translation speed and a high degree of reliability.

An object of the invention is to provide a dual drive screw with each drive capable of operating the entire assembly in the event of failure of the other unit.

A further object of the invention is to provide a dual drive screw which can only be reversed by the power operation of the worm gear drive or drives.

Figure 1:
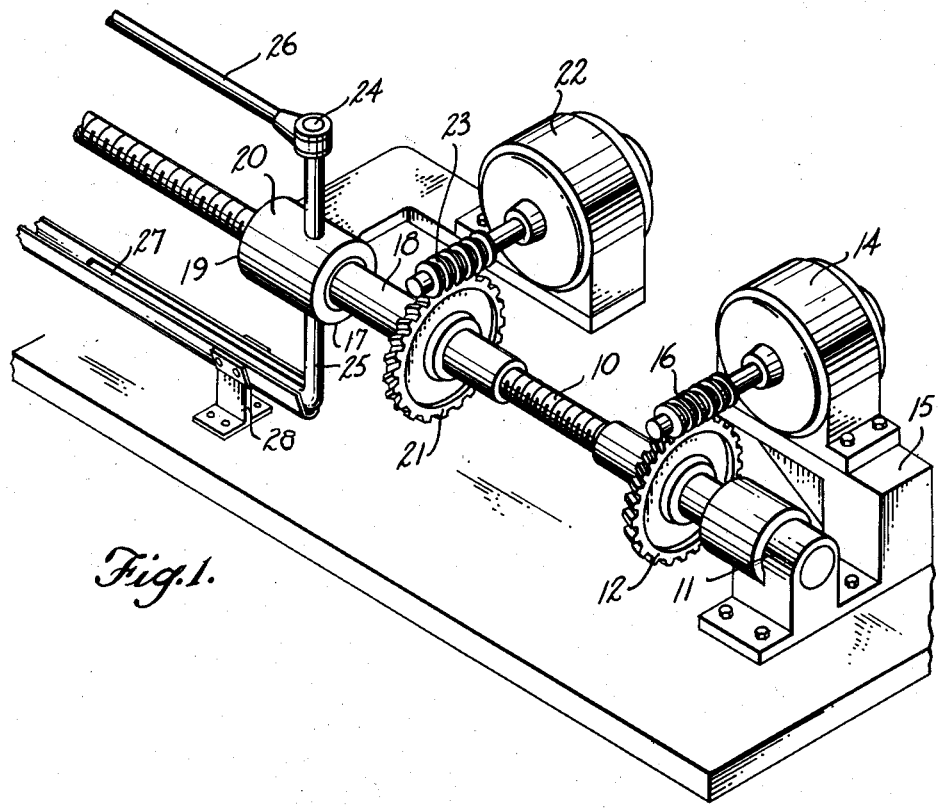
Figure 2:
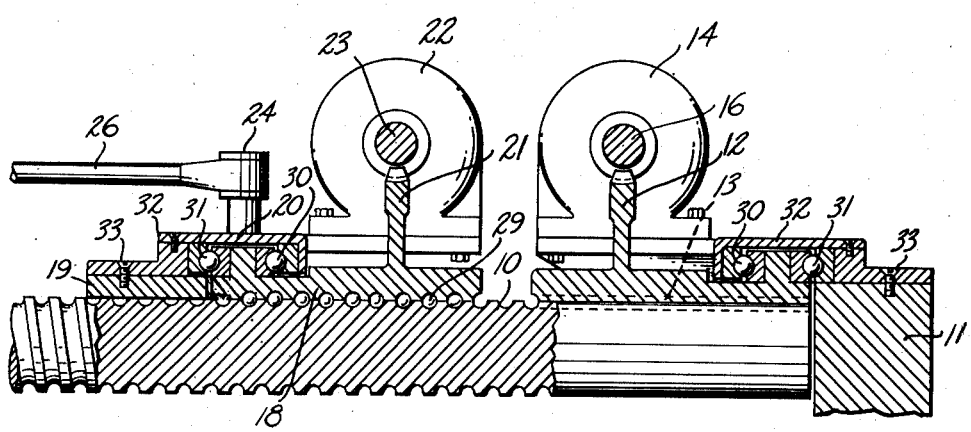

The purpose and objects of the invention will become more apparent as the following description is read in conjunction with the drawings in which like numbers designate the same part throughout the several views:

Figure 1 is a partial perspective view of the operational end of the dual drive screw, and Figure 2 is a half-sectional view taken on the screw centerline.

More particularly, the invention comprises a rotatable screw 10 mounted on thrust bearings 11 secured to a structure, a driven gear 12 keyed 13 to the screw 10 adjacent the thrust bearing 11, a power unit 14 mounted on the thrust bearing support 15, a worm gear 16 to transmit power from the unit 14 to the driven gear 12, sleeve member 17 composed of the nut 18 and the housing 19, connected through a thrust bearing assembly 20 for movement along the screw 10, a second driven gear 21 made integral with the nut 18, a second power unit 22 mounted on the housing 19, a second worm gear 23 to transmit power from the unit 22 to the driven gear 21, mounting projections 24, 25 on the housing 19 to receive connecting rods 26, 27 extending to movable elements (not shown), and a restraining-supporting member 28 attached to the structure to support the housing 19 by receiving the projection 25 and rod 27 and to restrain the housing 19 from rotational movement.

The threads 29 are of the ball bearing type permitting rapid translation when both power units 14 and 22 are operating. The thrust bearings used are composed of the circular races 30, balls 31 and cover portions 32 secured by machine screw fasteners 33. (Radial bearings are not shown.)

In operation, when power is supplied to the unit 14 to rotate the screw 10 the sleeve member 17 moves along the axis of the screw 10. As power is simultaneously supplied to the unit 22 to rotate the nut 18 of the sleeve member 17 in the opposite direction, the speed of translation is accordingly increased. The power to unit 14 may be stopped and the translation will continue under the power of unit 22.

The housing 19, restrained from rotary movement by the member 28, travels along the screw axis to move connecting rods 26, 27 which in turn control the positioning of movable elements (not shown) such as stabilizers for aircraft. Where the travel along the screw axis is limited, the power screw may be supported at only one end and the housing suspended from a hinged support (not shown).

By utilizing the inventive dual screw drive the following advantages are realized: the latent safety feature of continued operation when one power unit fails, and the compactness of the assembly reducing the space requirement attributed to a larger single power unit assembly having comparable performance characteristics.

I claim:

1. A dual drive screw assembly comprising the structure and movable elements of an airplane, a power screw mounted on the said structure, bearings supporting the said power screw, a power unit mounted at the said bearing support, a worm gear assembly to transmit power from the said power unit to the said screw, a non-rotatable housing, a nut interconnected with the said housing and threadably engaging the said screw, a thrust bearing separating the said housing and the said nut, a second power unit mounted on the said housing, a worm gear unit to transmit power from the said second power unit to the said nut, mounting projections on the said housing, connecting rods secured between the said projections and said movable elements, and a restraining member attached to the structure preventing the said housing from rotating.

2. A dual drive screw comprising mountable thrust bearings, a power screw supported by the said thrust bearings, a power unit integrally mounted on the support of the said bearings, a worm gear assembly to transmit power from the said power unit to the said screw, a multiple sectioned sleeve member, a nut as one section rotatably and threadably engaged with the said screw, a non-rotatable housing as another section of the said sleeve member, a thrust bearing separating the multiple sections of the said sleeve member, a second power unit mounted on the said non-rotatable housing, a worm gear unit to transmit power from the said second power unit to the said rotatable nut, mounting projections on the said non-rotatable housing, connecting rods secured between the said projections and any member to be moved for transmitting the motive power, and a restraining member preventing the housing from rotating.

FRANK TERDINA.

REFERENCES CITED

The following references are of record in the file of this patent:

UNITED STATES PATENTS

| Number | Name | Date |
|---|---|---|
| 2,333,341 | Scrivener | Nov. 2, 1943 |